C. G. CURTIS.
MARINE STEAM TURBINE.
APPLICATION FILED NOV. 19, 1910.
1,008,531.
Patented Nov. 14, 1911.
6 SHEETS—SHEET 1.
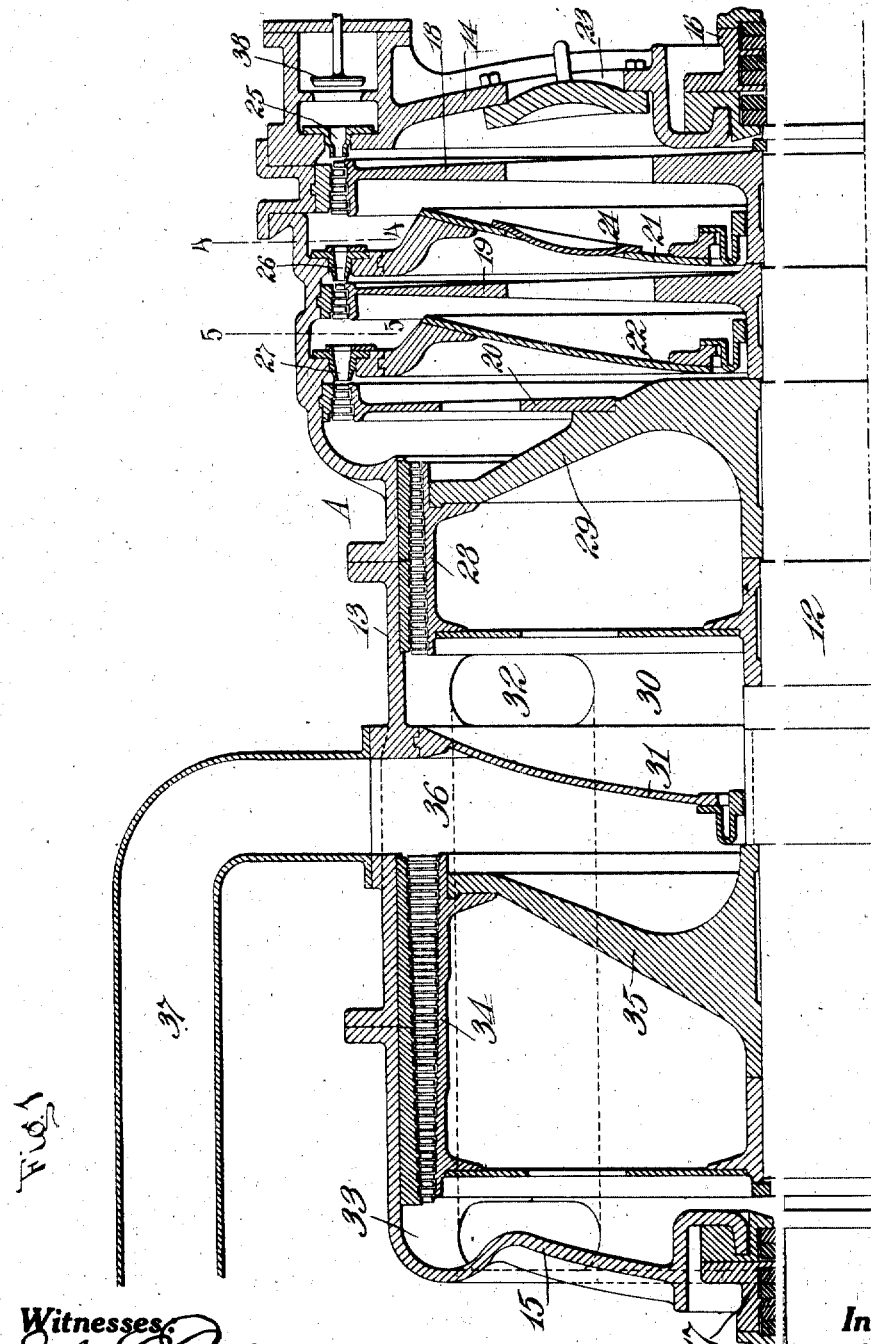

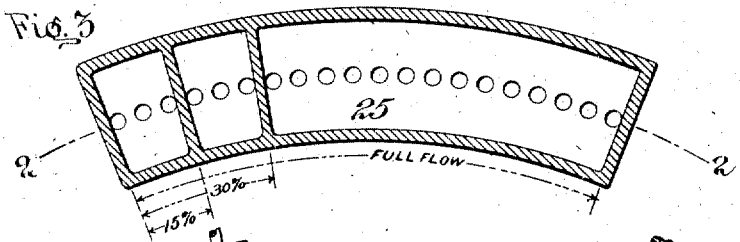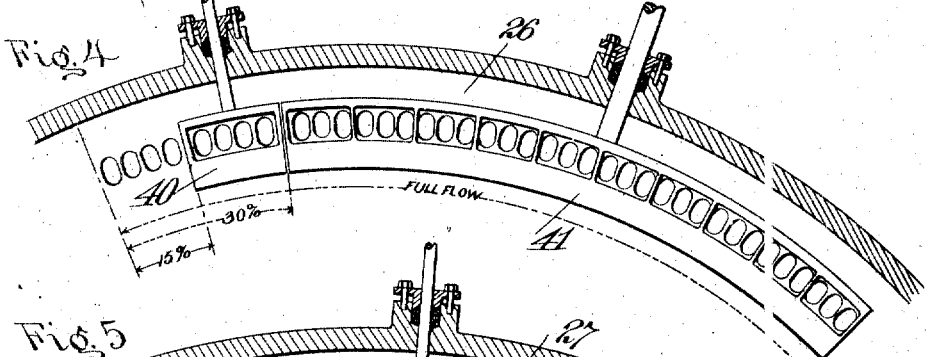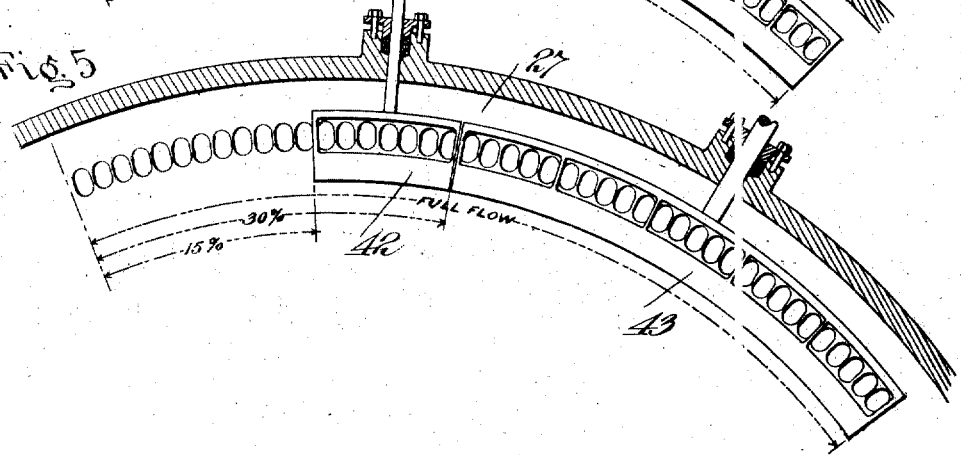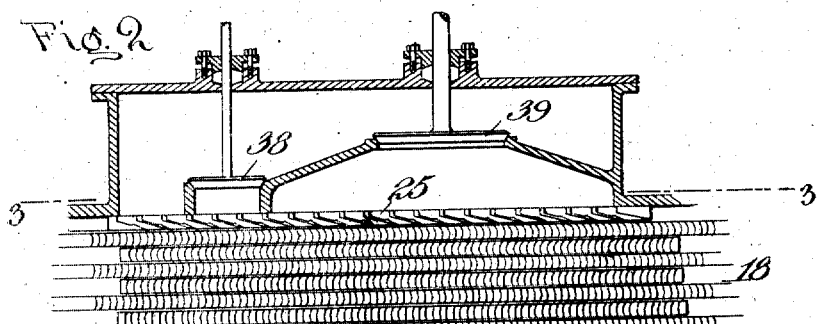

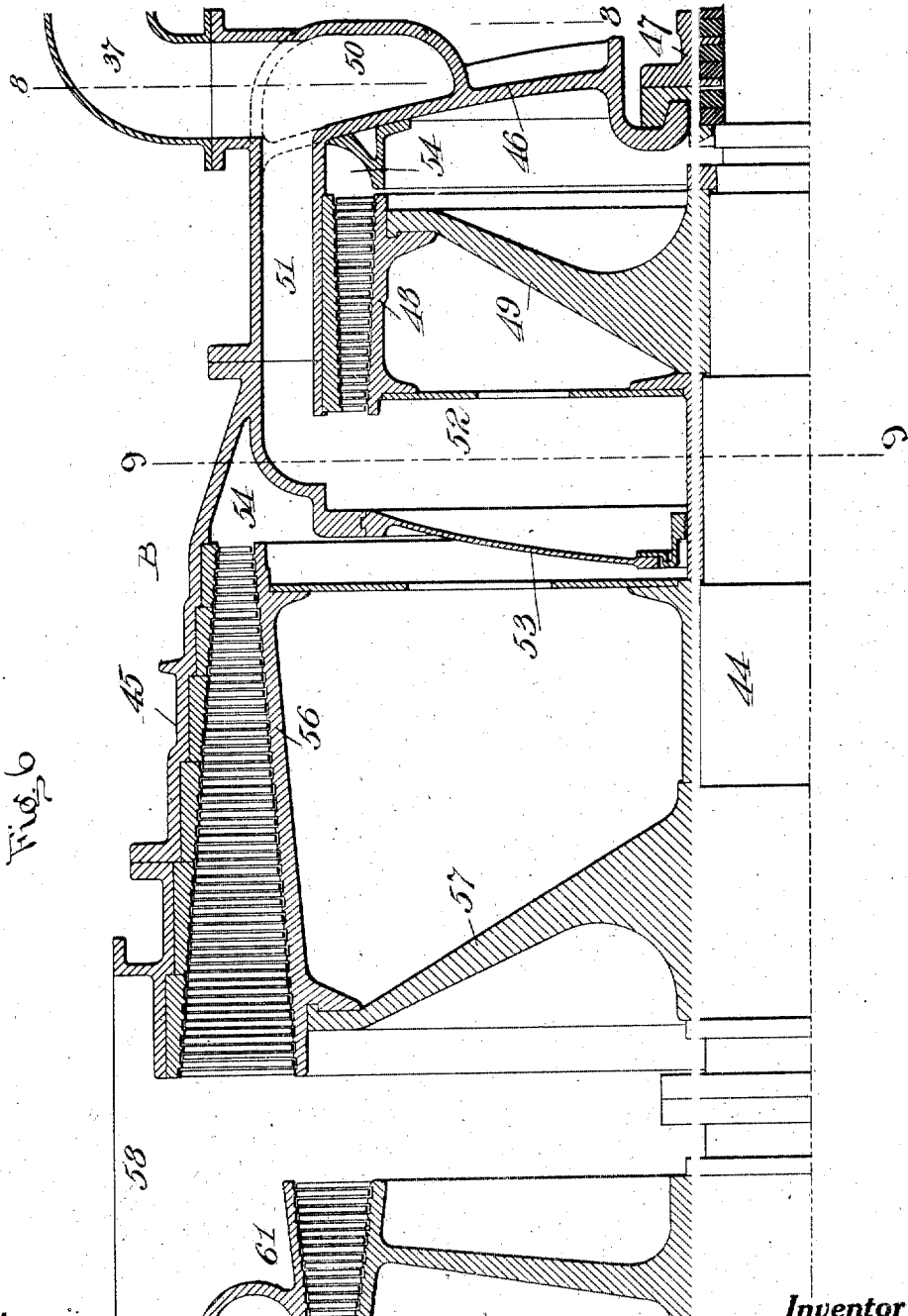

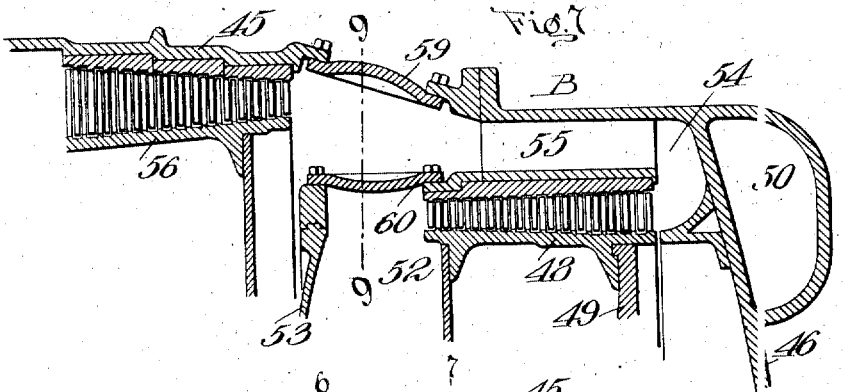
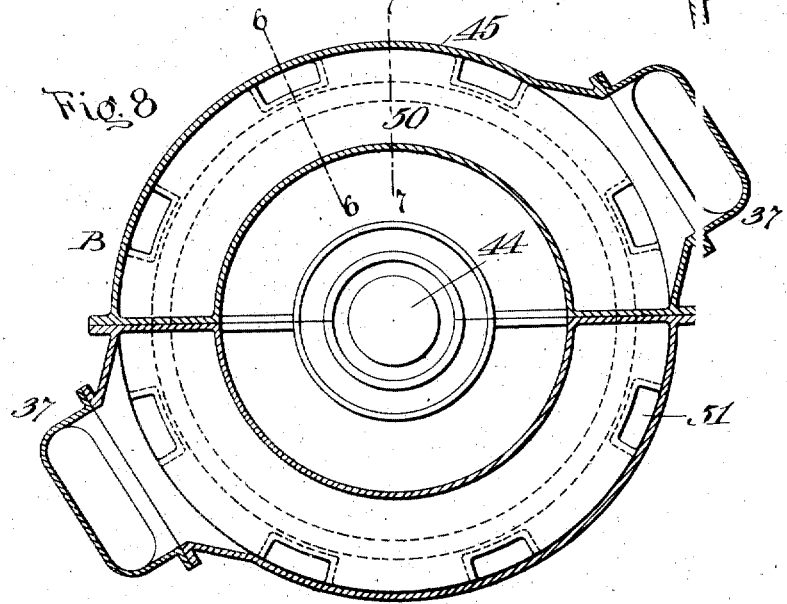
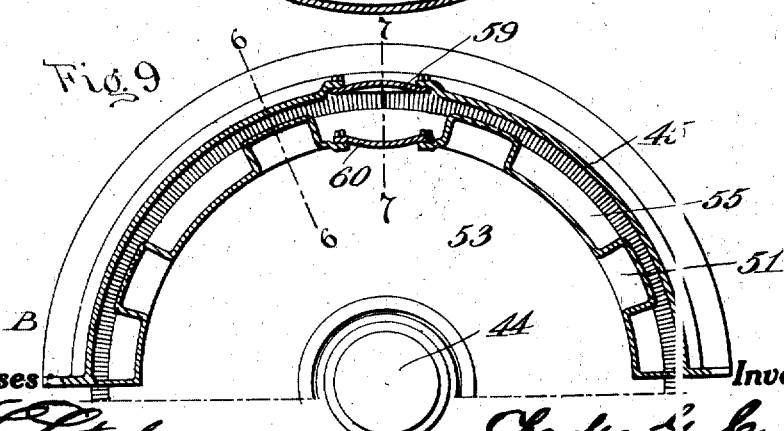

C. G. CURTIS.
MARINE STEAM TURBINE.
APPLICATION FILED NOV. 19, 1910.
1,008,531.
Patented Nov. 14, 1911
6 SHEETS—SHEET 5.
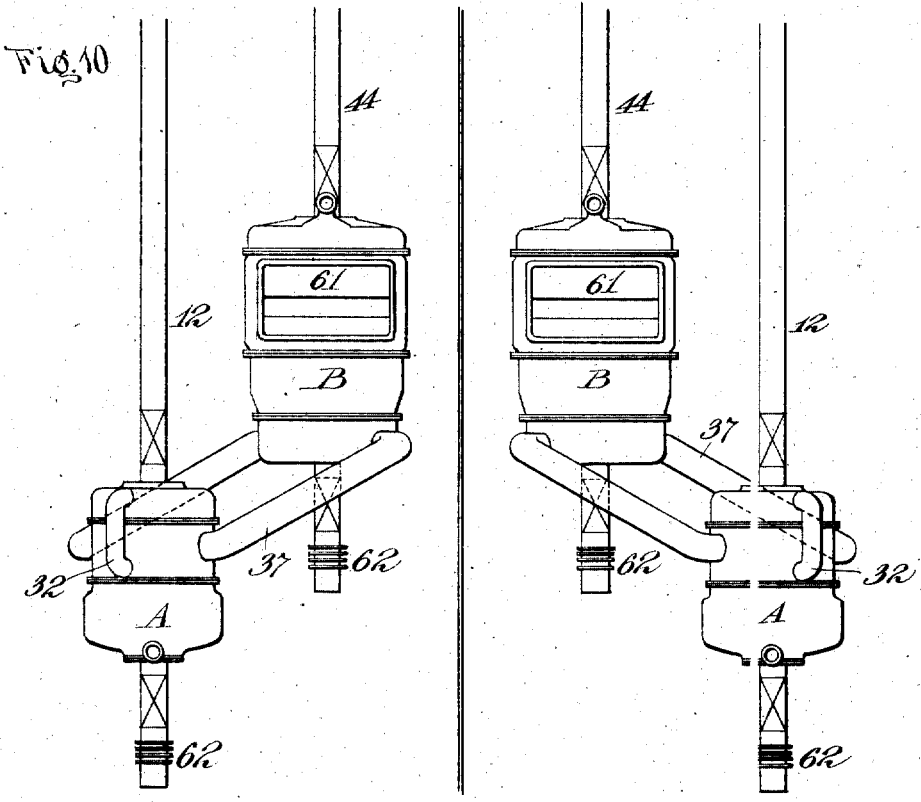
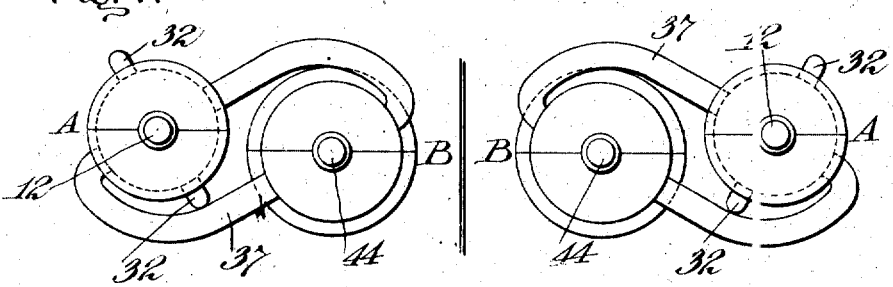

C. G. CURTIS.
MARINE STEAM TURBINE.
APPLICATION FILED NOV. 19, 1910.
1,008,531.
Patented Nov. 14, 1911.
6 SHEETS—SHEET 6.
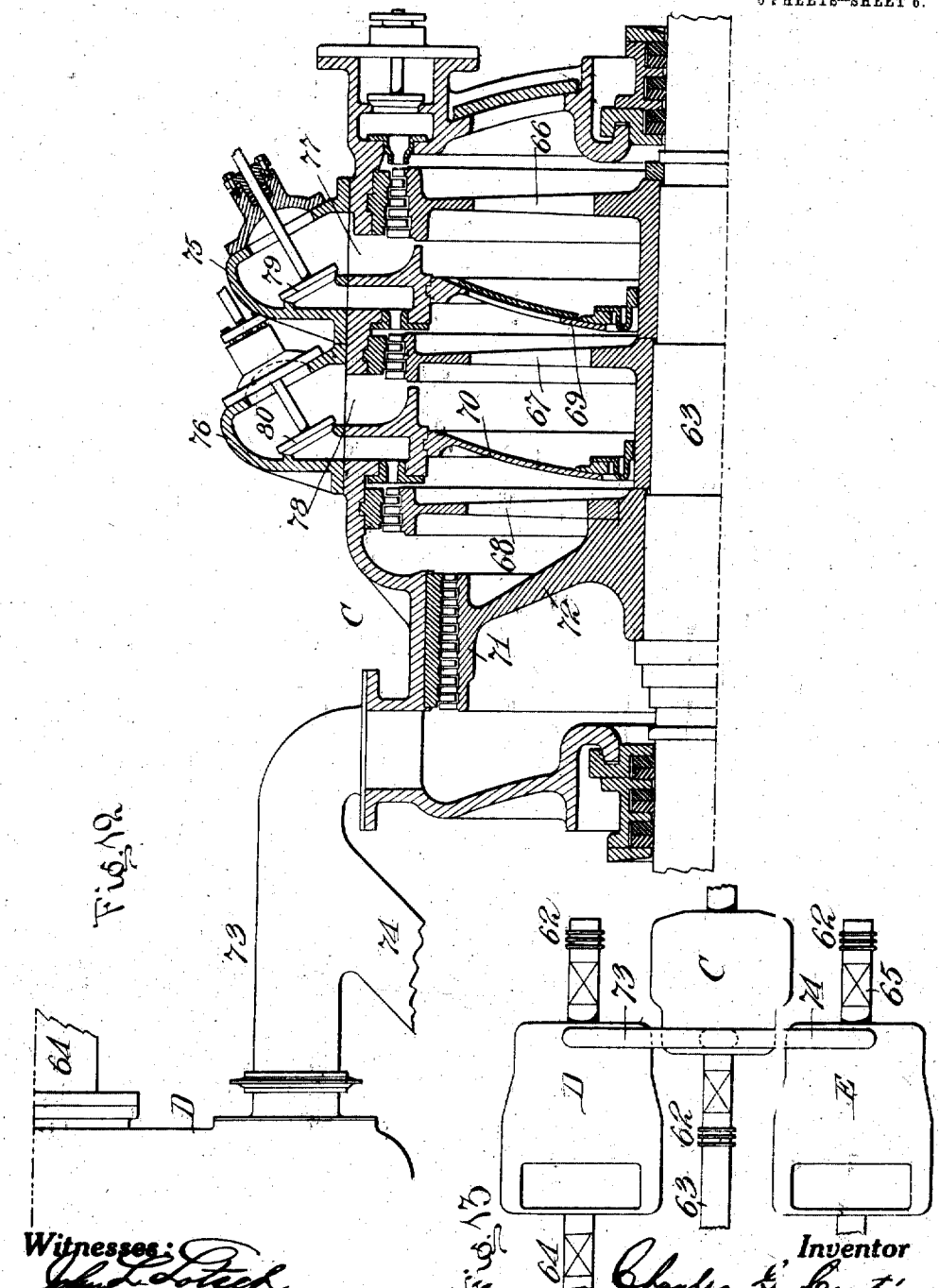
Witnesses:
Inventor
Charles G. Curtis
By Dyer, Dyer & Taylor
Attorneys.

UNITED STATES PATENT OFFICE.

CHARLES G. CURTIS, OF NEW YORK, N. Y.

MARINE STEAM-TURBINE.

1,008,531. Specification of Letters Patent. Patented Nov. 14, 1911.

Application filed November 19, 1910. Serial No. 593,161.

*To all whom it may concern:*

Be it known that I, CHARLES G. CURTIS, a citizen of the United States, residing at New York city, in the county and State of New York, have invented a certain new and useful improvement in Marine Steam-Turbines, of which the following is a specification.

The object I have in view is to simplify and cheapen the construction and repair and also to increase the efficiency of marine steam turbines, particularly those having initial jet impulse stages.

My present invention is an improvement upon that set forth in my application for patent of even date herewith (Serial No. 593,159); and consists in part in a novel construction whereby the principle of balancing the thrusts, including that of the propeller, by reversed drum pressure stages, set forth in that application, is made useful in a marine steam turbine having turbine elements of substantially equal power mounted on separate shafts.

The invention is applicable to a 4-shaft arrangement where two turbines are employed, each consisting of a high and a low pressure element of substantially equal power mounted on separate shafts and taking the full steam flow in succession. It is also applicable to a 3-shaft arrangement wherein a single turbine is employed consisting of three elements, a high pressure element mounted on one shaft and two low pressure elements mounted on the other two shafts and taking the steam in multiple from the high pressure element, all three of said elements being designed to develop substantially equal power. In carrying out this part of my invention in the two-element turbine where the power is equally divided between the two shafts, I employ reversed drum stages in the low as well as in the high pressure element of the turbine, the steam pressure entering the low pressure element being so high that it would be impracticable to employ it on a direct drum stage to neutralize the thrust of the propeller. The high pressure element also has one or more initial jet wheel stages. In the three-element turbine, where each shaft does one-third the work, the high pressure element consists of a number of initial jet wheel stages and a drum pressure stage having a small enough pressure difference to practically neutralize the propeller thrust, and the two low pressure elements, between which the steam is divided equally, are provided with reversed drum pressure stages, the steam pressure at the admission end of these elements being too high for direct use in neutralizing the propeller thrust.

Another feature of my invention, which is applicable to my marine steam turbine having reversed drum stages whether made complete in one casing or divided into two or more elements, consists in using several initial jet wheel stages and in having stage valves for each of these wheel stages so as to enable the adjustment of the pressure distribution under cruising conditions in such way as to get the most efficient result. The drum stage following the wheel stages has a definite steam passage area which there is no means of reducing, and, by reason of this, when the steam flow is reduced under cruising conditions the pressure at the head of this drum stage drops very decidedly. For example, at full power the steam pressure at the head of the first drum stage may be 70 pounds, whereas when the steam flow is reduced for cruising, this pressure may drop to 20, or even 10, pounds. Under these conditions, unless the nozzle areas of the several preceding wheel stages are reduced in certain proportions the wheel stages after the first will do very little or practically no work. By regulating the steam pressures by means of stage valves to suit the reduced steam flow existing under one or more cruising conditions, these velocity stages after the first can be made to do a large amount of work, and thereby secure an increased efficiency of the turbine.

In the drawing the two-element turbine is shown in Figures 1 to 11, while the three-element turbine is shown in Figs. 12 and 13. Fig. 1 is a longitudinal section of the upper half of the high pressure element of the two-element turbine; Fig. 2 is section (on the line 2—2 in Fig. 3) through the nozzles, steam chest and controlling valves for the first jet wheel stage; Fig. 3 is a section of the first stage steam chest on line 3—3 in Fig. 2; Figs. 4 and 5 are sections on lines 4—4 and 5—5 respectively in Fig. 1 showing the controlling valves for the nozzles of the second and third wheel stages; Fig. 6 is a longitudinal section similar to Fig. 1 of the low pressure element of the turbine, the section of the steam passages being taken on line 6—6 in Figs. 8 and 9; Fig. 7 is a longitudinal section taken on line 7—7 in Figs. 8 and 9; Figs. 8 and 9 are cross sections taken on lines 8—8 and 9—9 respectively in Fig. 6; Fig. 10 is a plan view of the engine room of a 4-shaft ship showing two of the turbines illustrated by the other figures assembled; Fig. 11 is a fore end elevation of the assembled turbines; Fig. 12 is a half longitudinal section of the high pressure element of the three-element turbine, showing in outline the head of the casing of one of the low pressure elements; and Fig. 13 is a plan view illustrating the elements of the three-element turbine assembled in a 3-shaft arrangement.

Referring first to the high pressure element of the two-element turbine shown in Figs. 1 to 5, the shaft 12 carries the rotating parts while the stationary parts are carried by the casing having sides 13 and fore and aft heads 14, 15, through stuffing boxes 16, 17, in which the shaft passes. As shown, three initial jet wheel stages are employed whose wheels are shown at 18, 19 and 20 and the two separating diaphragms are indicated by 21 and 22. The casing head 14 has one or more covered man-holes or hand-holes 23 for giving access through one or more openings in the web of wheel 18 to the bushing or packing of the diaphragm 21 while one or more covered man-holes or hand-holes 24 in the diaphragm 21 give access in a similar manner to the bushing or packing of the diaphragm 22. The first stage nozzles 25 are carried by the head 14, while the second and third stage nozzles 26, 27 are carried by the diaphragms 21, 22. Following the third wheel stage is a drum pressure stage whose drum 28 is supported from the shaft in part by a steam tight head 29 which closes the steam space between the drum and the shaft and is formed and proportioned to withstand the pressure difference to which it will be subjected without change of shape. The first drum stage includes a number of annular rows of moving and stationary buckets operating on the impulse or reaction principle and having a complete peripheral admission of the steam. The first drum stage receives the steam directly from the last wheel stage and delivers it to a space 30 in front of a diaphragm 31, where it enters pipes 32 leading to a chamber 33 inside the aft head 15 from which it enters a second drum pressure stage similar to the first drum stage, but reversed with respect to the steam flow. The drum 34 of the second drum stage has a pressure head 35 similar to the pressure head 29, but adapted to resist a pressure difference exerted in the opposite direction. The steam from the second drum stage is discharged into a space 36 aft of the diaphragm 31 from which one or more pipes 37 carry the steam to the low pressure element of the turbine. The steam pressure drops in passing through each drum stage producing a pressure difference on the heads 29 and 35 and exerting thrusts in opposite directions on the shaft. By proportioning the steam passage areas through the drum stages to secure the proper pressure drop between the two ends of each drum stage and by having the thrust areas at the drum stages of the proper relative amounts, there will be secured, as explained in my application referred to, a partial balancing of the thrusts within the high pressure element of the turbine, leaving a resultant turbine thrust opposed to and wholly or largely neutralizing at all substantial powers the thrust of the propeller which is mounted upon the same shaft. For securing increased economy under one or more cruising conditions, stage valves are employed, as already stated. The disk valve 38, 39 (Figs. 1 and 2) close respectively fifteen and seventy per cent. of the first stage nozzles, the remaining first stage nozzles equal to 15 per cent. of the full steam flow being left constantly open. Corresponding portions of the nozzles of the second and third stages are also left open. The slide valves 40, 41 at the second stage nozzles and the slide valves 42, 43 at the third stage nozzles secure an efficient pressure distribution when the steam flow is reduced by closing the corresponding first stage valves. For example, at full load, all the stage valves being open, the steam pressures in the three wheel stages may be, in pounds absolute, 100, 85 and 72, the last pressure being that at the head of the first drum stage; at 30% steam flow, produced by closing the large valves 39, 41 and 43, the corresponding steam pressures may be 100, 46 and 21 pounds (absolute); and at 15% steam flow, produced by closing all the stage valves, the corresponding steam pressures may be 100, 35 and 11 pounds (absolute). This result will be secured by proportioning the areas covered by the second and third stage valves substantially as shown in the drawing. Any desired different distribution of pressures can be secured by properly proportioning these valve-controlled nozzle areas. If by maintaining the first stage pressure the same at lower powers as at full power, the thrust, opposed to the propeller thrust, produced by this pressure on the shaft-thrust area resulting from stepping down the shaft at its ends, should, in the particular design of the turbine, be larger than desired at less than full power, the stage valves could be proportioned to drop the pressure in the first stage to any desired extent.

The low pressure element of the turbine (Figs. 6, 7, 8 and 9) is mounted on a shaft 44 which carries the rotating parts, while the stationary parts are carried by the casing whose sides are indicated by 45 and its fore head by 46. The shaft passes through stuffing boxes in the heads of the casing, the fore stuffing box 47 being shown in Fig. 6. At the fore end of the low pressure casing is a drum pressure stage similar to the drum stages of the high pressure element. Its drum 48 has a steam tight pressure head 49 and the steam passes through this stage in a forward direction so that the pressure difference on the head 49 exerts a thrust in the same direction as the propeller thrust. The pipes 37 from the high pressure element connect with a chamber 50 in the fore head 46 from which channels 51 in the sides of the casing lead aft to a chamber 52 at the admission end of drum 48, which chamber 52 is closed on its aft side by a diaphragm 53. The steam flows from the chamber 52 forward through the first drum stage of the low pressure element and discharges into an annular space 54 at the fore head 46, from which it is carried aft through channels 55 in the casing to the aft side of the diaphragm 53. Here it enters a second drum pressure stage similar to the first drum stage, but carrying the steam aft-ward instead of forward. Its drum 56 has a steam tight pressure head 57, the difference in pressure upon which exerts a thrust on the shaft opposed to the propeller thrust. The second drum stage of the low pressure element discharges the steam into the exhaust 58, the pressure head 57 being exposed to the exhaust pressure on its aft side. The chamber 52 which affords room for the repair and replacement, in segments, of the bushing or packing of the diaphragm 53 is accessible through covered man-holes or hand-holes 59, 60. The reversing element 61 of the turbine is also inclosed by the casing of the low pressure element. It is shown in part at the left in Fig. 6.

In order to give the low pressure element substantially the same power as the high pressure element the pressure of the steam entering the low pressure element will be too high (for example, 19.25 pounds, absolute, at full power) for use in neutralizing the propeller thrust by a single drum stage with the large pitch diameter necessary to give the desired low shaft speed with a satisfactory length of the turbine. Hence I employ the reversed drum stage. By proportioning the steam passage areas through the two drum stages to secure the proper pressure drop between the two ends of each drum stage and by having the thrust areas at the drum stages of the proper relative amounts, there will be secured, as explained in my application referred to, a partial neutralization of the thrusts within the low pressure element of the turbine, leaving a resultant turbine thrust opposed to and wholly or largely neutralizing at all substantial powers the thrust of the propeller which is mounted upon the same shaft.

In Figs. 10 and 11 two of the two-element turbines are shown assembled in a 4-shaft arrangement. A and B are the high and low pressure elements of each turbine, the latter including the reversing elements 61. The high pressure elements are mounted on the wing propeller shafts 12, while the low pressure elements are mounted on the center propeller shafts 44. The thrust blocks of the several shafts which take the unbalanced thrust, if any, one way or the other, are indicated at 62.

The three-element turbine (Figs. 12 and 13) comprises a high pressure element C and two low pressure elements D and E, of substantially equal power, mounted on the center and wing propeller shafts 63, 64 and 65, having thrust blocks 62. The high pressure element C has three initial jet wheel stages whose wheels are shown at 66, 67 and 68, and whose separating diaphragms are shown at 69, 70. These are followed by a short drum pressure stage whose drum 71 is supported from the shaft by a steam tight pressure head 72. This drum stage carries the steam in the same direction as the preceding wheel stages and produces a thrust opposed to the propeller thrust. The power being divided equally between the three elements of the turbine and a higher steam pressure (for example, 40 pounds, absolute, at full power) being required at the admission end of the low pressure elements D, E, to develop the same power with one-half the steam flow, than with the low pressure element B of the two-element turbine which receives the full steam flow, it is possible to secure the necessary reduction in steam pressure in the high pressure element C in advance of the drum stage by a limited number of wheel stages. Consequently the propeller thrust on the shaft 63 on which the element C is mounted can be practically neutralized at all substantial powers by a single direct drum stage in this element without an excessive number of preceding velocity stages. The steam is delivered from the high pressure element C to the low pressure elements D, E through pipes 73, 74. The low pressure elements D, E may be the same in construction as the low pressure element B of the two-element turbine, except that they are proportioned for a higher steam admission pressure. Each element D, E, has, like the element B, reversed drum pressure stages which partially balance the thrusts within the element, leaving a resultant thrust opposed to and practically neutralizing at all substantial powers the thrust of the propeller. The low pressure elements D, E, also have, like the element B, each a reversing turbine element within the same casing. The high pressure element C is also preferably provided with stage valves having the same function as the stage valves of the high pressure element A. A different construction of the valves for the second and third stages is shown in connection with the element C, which may be used in place of the slide valves of element A. Steam chests 75, 76 for the second and third wheel stages are secured on the outside of the turbine casing, and the second and third stage nozzles are carried by the casing. The first and second stage buckets discharge into chambers 77, 78 opening outwardly through the casing into the steam chests 75, 76, and disk valves 79, 80 control the flow of steam from the steam chests 75, 76 to the nozzles of the second and third stages. It will be understood that, as in the case of the first stage nozzles of the high pressure element A, the passage from the steam chests 75, 76 to the nozzles will be divided into three sections of the desired nozzle area and that there will be separate valves for each stage for controlling two of these sections so as to secure, with the disk valves, the same character of control of the steam flow in the second and third wheel stages of element C as with the slide valves for the second and third wheel stages of element A.

What I claim is:—

1. In a marine steam turbine, the combination of high and low pressure elements mounted on separate shafts, means in the high pressure element producing a thrust opposed to the propeller thrust on the high pressure shaft, and reversed drum pressure stages in the low pressure element producing thrusts opposed to the propeller thrust on the low pressure shaft, substantially as set forth.

2. In a marine steam turbine, the combination of high and low pressure elements mounted on separate shafts and reversed drum stages in each element producing thrusts opposed to the thrust of the propellers on the two shafts, substantially as set forth.

3. In a marine steam turbine, the combination of high and low pressure elements mounted on separate shafts, one or more initial jet wheel stages in the high pressure element, means in the high pressure element producing a thrust opposed to the propeller thrust on the high pressure shaft, and reversed drum pressure stages in the low pressure element producing a thrust opposed to the propeller thrust on the low pressure shaft, substantially as set forth.

4. In a marine steam turbine, the combination of high and low pressure elements mounted on separate shafts, one or more initial jet wheel stages in the high pressure element and reversed drum stages in each element producing thrusts opposed to the thrust of the propellers on the two shafts, substantially as set forth.

5. In a marine steam turbine, the combination with reversed drum stages, of two or more initial jet wheel stages and stage valves controlling the areas of the nozzles of the several wheel stages so as to increase the efficiency of the turbine under one or more cruising conditions, substantially as set forth.

This specification signed and witnessed this 15th day of November, 1910.

CHARLES G. CURTIS.

Witnesses:
JOHN L. LOTSCH,
GUSTAV SCHELLACK.